(12) United States Patent
Fang et al.

(10) Patent No.: US 11,094,222 B2
(45) Date of Patent: Aug. 17, 2021

(54) HANDS-ON LEARNING PLAY CONTROLLED VIDEO DISPLAY

(71) Applicant: International Business Machines Corporation, Armonk, NY (US)

(72) Inventors: Wu Song Fang, Beijing (CN); Su Liu, Austin, TX (US); Ting Chen, Beijing (CN); Zhi Kong, Xishui (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/662,072

(22) Filed: Oct. 24, 2019

(65) Prior Publication Data
US 2021/0125519 A1    Apr. 29, 2021

(51) Int. Cl.
| | |
|---|---|
| G06F 3/048 | (2013.01) |
| G09B 19/00 | (2006.01) |
| G06F 16/735 | (2019.01) |
| G09B 5/02 | (2006.01) |
| G06F 3/0354 | (2013.01) |
| G06K 9/00 | (2006.01) |

(52) U.S. Cl.
CPC ....... *G09B 19/003* (2013.01); *G06F 3/03545* (2013.01); *G06F 16/735* (2019.01); *G06K 9/00711* (2013.01); *G09B 5/02* (2013.01)

(58) Field of Classification Search
None
See application file for complete search history.

(56) References Cited

U.S. PATENT DOCUMENTS

| | | | |
|---|---|---|---|
| 4,689,022 | A | 8/1987 | Peers |
| 5,825,356 | A | 10/1998 | Habib |
| 6,690,390 | B1 | 2/2004 | Walters |

(Continued)

FOREIGN PATENT DOCUMENTS

| | | | |
|---|---|---|---|
| CN | 102833490 | A | 12/2012 |
| CN | 103108248 | A | 4/2016 |
| CN | 106648675 | A | 5/2017 |

OTHER PUBLICATIONS

Pongnumkul, et al., Pause and Play: Automatically Linking Screencast Video Tutorials with Applicaitions, 2011, UIST '11, pp. 135-144 (Year: 2011).*

(Continued)

*Primary Examiner* — William C Trapanese
(74) *Attorney, Agent, or Firm* — Joseph P. Curcuru (57) ABSTRACT

Embodiments describe an approach for concurrently managing a video display and an application user interface. Embodiments describe generating a translucent mask video display over a computer-implemented application and displaying a video in the translucent mask video display over the computer-implemented application. Additionally, embodiments describe detecting user activity associated with the computer-implemented application and pausing the video in the translucent mask video display when the user activity is detected. Responsive to an end to the user activity, embodiments describe translating the detected user activity as a set of computer operations, outputting the set of computer operations for performance on the computer-implemented application, and resuming the video in the translucent mask video display.

17 Claims, 4 Drawing Sheets

(56) References Cited

U.S. PATENT DOCUMENTS

| | | | |
|---|---|---|---|
| 2004/0229194 A1* | 11/2004 | Yang | G09B 7/02 |
| | | | 434/118 |
| 2005/0028102 A1* | 2/2005 | Schinner | H04N 21/8153 |
| | | | 715/718 |
| 2008/0288865 A1 | 11/2008 | Raffel | |
| 2013/0129316 A1* | 5/2013 | Dontcheva | H04N 5/76 |
| | | | 386/241 |
| 2017/0060601 A1 | 3/2017 | Joshi | |
| 2018/0205904 A1* | 7/2018 | Baughman | H04N 21/2668 |

OTHER PUBLICATIONS

Pongnumkul et al., "Pause-And-Play: Automatically Linking Screencast Video Tutorials With Applications", UIST'11, Oct. 16-19, 2011, Santa Barbara, CA, USA, Copyright 2011 ACM, 10 pages.

* cited by examiner

HANDS-ON LEARNING PLAY CONTROLLED VIDEO DISPLAY

BACKGROUND OF THE INVENTION

The present invention relates generally to the field of video display, and more particularly to displaying and accessing videos while concurrently programming or interacting with computer or mobile applications.

Internet videos or online videos are the general field that deals with the transmission of video over the internet. Internet video exists in several formats, the most notable being moving picture experts group-4 advanced video coding (MPEG-4 AVC), advanced video coding high definition (AVCHD), and flash video (FLV). Currently there are several online video hosting services that are available both publicly and privately. Online videos have multiple uses ranging from education to entertainment. One of the major uses of online videos is the distribution and access to video tutorials or video guides that provide users with step by step instructions on how to repair a particular problem or how to create something the user is interested in building or creating. Online videos can be played/viewed on smartphones, smartwatches, computers, laptops, and smart televisions (TV's).

SUMMARY

Embodiments of the present invention disclose a method, a computer program product, and a system for concurrently managing a video display and an application user interface, the embodiments comprising: generating a translucent mask video display over a computer-implemented application; displaying a video in the translucent mask video display over the computer-implemented application; detecting user activity associated with the computer-implemented application; pausing the video in the translucent mask video display when the user activity is detected; responsive to an end to the user activity, translating the detected user activity as a set of computer operations; outputting the set of computer operations for performance on the computer-implemented application; and resuming the video in the translucent mask video display.

DETAILED DESCRIPTION

Embodiments of the present invention recognize that when people use an application and watch a video (e.g., video guide) while concurrently interacting with the application, it is inconvenient for the user to switch between displays. Some conventional approaches to solve this problem is using a second device, using multiple monitors, and resizing the windows of the application and video to show them in the same screen at the same time. Currently in the art users cannot fluently control the playing of the video and simultaneous interactions with the application. Oftentimes a user is playing a video to receive some guidance for solving an application related problem they are working on. In such cases, the user gets the needed information then pauses the video to perform the necessary task on the application. After performing certain steps, the user returns to the video player to continue playing the video to receive more guidance regarding the application related problem. This process of a user switching back and forth between the video player and the application being worked on continues until the user solves the problem.

Some embodiments of the present invention are directed to showing a video and the open application in the same screen without changing the window size of either one. Some embodiments of the present invention are directed to synchronizing the progress of a video and the operations on an application. Some embodiments of the present invention are directed to enabling the user to view a video while concurrently interacting with an application. Additionally, some embodiments of the present invention are directed to enabling a user to control the progress of an instructional video according to progress made interacting with a corresponding application. Embodiments of the present invention enable a user to play and control the progress of a video while the user concurrently performs operations in an application for which the video is providing operational instructions.

The terms application and mobile application are used interchangeably herein and are representative of any type of computer and/or mobile application known in the art.

The term "video" should be construed to have the same meaning as a video guide/video tutorial, online video, streaming video, live streaming video, and/or any other type of accessible video known in the art.

It should be noted herein that in the described embodiments, participating parties have consented to having their images captured, uploaded and saved and their activity recorded and monitored. Participating parties are aware of the potential that such recording and monitoring may be taking place. In various embodiments, for example, when downloading or operating an embodiment of the present invention, the embodiment of the invention presents a terms and conditions prompt enabling the interested parties to opt-in or opt-out of participation.

Implementation of embodiments of the invention may take a variety of forms, and exemplary implementation details are discussed subsequently with reference to the figures (i.e., FIG. 1-FIG. 4).

Figure 1:
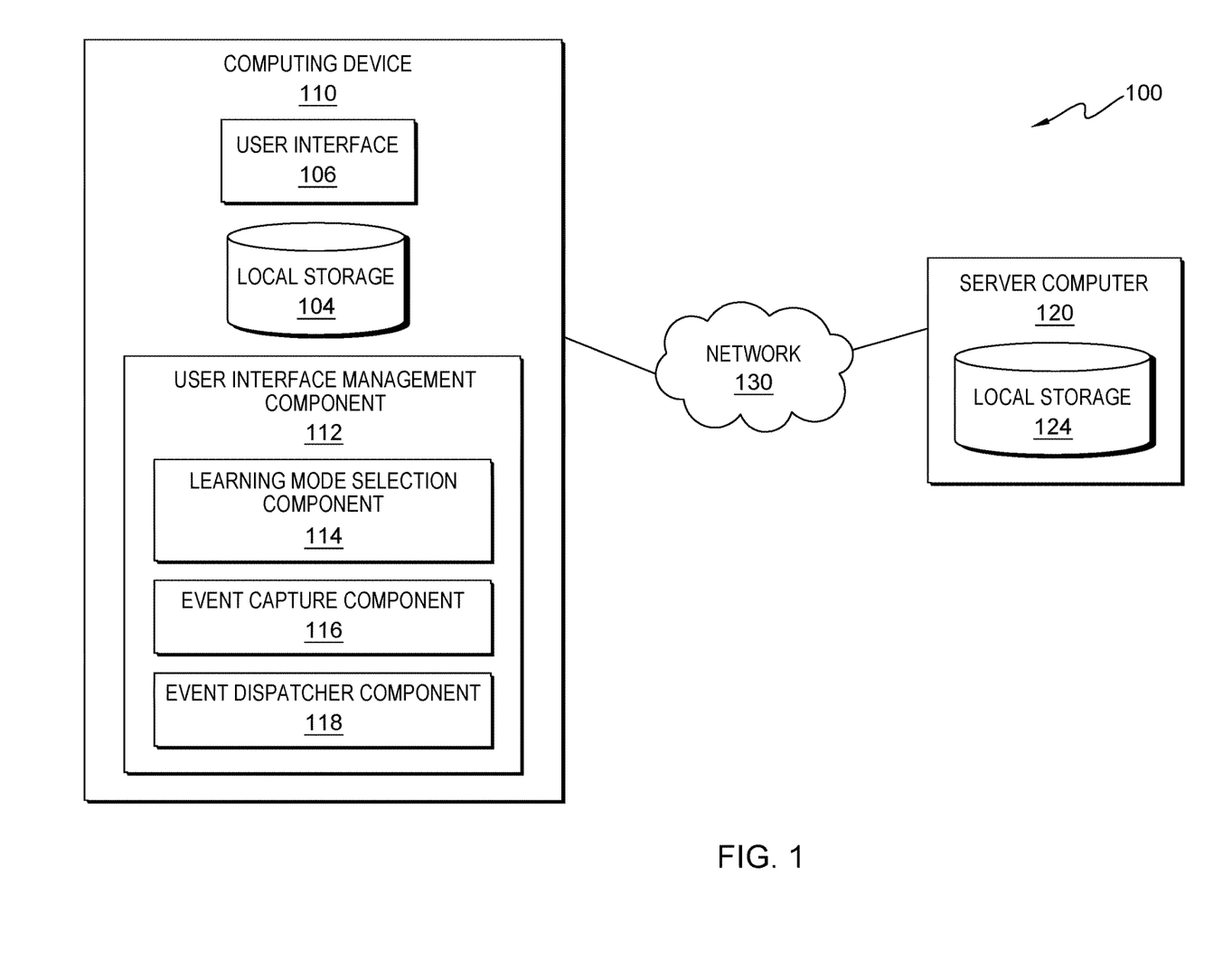
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110 and server computer 120, and any other computing devices and/or storage devices (not shown in FIG. 1) within distributed data processing environment 100.

In some embodiments of the present invention, computing device 110 can be, but is not limited to, a standalone device, a client server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface (interface) 106, local storage 104, and/or user interface manager component (interface manager) 112. In various embodiments, not depicted in FIG. 1, computing device 110 can comprise one or more cameras. In various embodiments, the one or more cameras can be low light cameras. In other embodiments, the one or more cameras can be any type of camera known in the art. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 5.

User interface (interface) 106 provides an interface to interface manager 112 on computing device 110. Computing device 110, via interface 106, can enable a user and/or a client to interact with interface manager 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces (e.g., application user interfaces (UI)), and instructions for operation. interface 106 can include information (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data, collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers and application server computers) that act as a single pool of seamless resources when accessed within distributed data processing environment 100. Server computer 120 can include internal and external hardware components, as depicted, and described in further detail with respect to FIG. 5.

Each of shared storage 124 and local storage 104 can be a data/knowledge repository and/or a database that can be written and/or read by one or a combination of interface manager 112, server computer 120 and computing device 110. In the depicted embodiment, shared storage 124 resides on server computer 120 and local storage 104 resides on computing device 110. In another embodiment, shared storage 124 and/or local storage 104 can reside elsewhere within distributed data processing environment 100, provided that each can access and is accessible by computing device 110 and server computer 120. Shared storage 124 and/or local storage 104 can each be implemented with any type of storage device capable of storing data and configuration files that can be accessed and utilized by server computer 120, such as, but not limited to, a database server, a hard disk drive, or a flash memory.

In some embodiments of the present invention, shared storage 124 and/or local storage 104 can each be a hard drive, a memory card, a computer output to laser disc (cold storage), and/or any form of data storage known in the art. In some embodiments, shared storage 124 and/or local storage 104 can each be one or more cloud storage systems and/or databases linked to a cloud network. In various embodiments, shared storage 124 and/or local storage 104 can access, store, and/or house capture user activity, selected videos, and/or data shared throughout distributed data processing environment 100.

In the depicted embodiment, interface manager 112 executes on computing device 110. In other embodiments, not depicted in FIG. 1, interface manager 112 can execute anywhere in distributed data processing environment 100 as long as interface manager 112 can communicate with computing device 110 and/or server computer 120 via network 130. In various embodiments of the present invention, interface manager 112 can enable the concurrent actions of playing and controlling of the progress of a video (e.g., video guide) while a user performs operations in an application. In various embodiments of the present invention, interface manager 112 can enable communication between a running video and a concurrently running application, wherein the video is displayed as a translucent mask over the application so the user can view the application and operate in the application simultaneously, further illustrated in FIG. 2.

In the depicted embodiments, interface manager 112 comprise three components: learning mode selection component (learning mode) 114, event capture component (event capture) 116, and event dispatcher component (dispatcher) 118. In various embodiments of the present invention, learning mode 114 can enable two modes: a normal mode and a hands-on mode. In the normal mode, the application runs and the video plays as normal. In the hands-on mode, the interface manager 112 can search the internet and select a video that matches the current application in use and the scenario the user is facing in relation to the application. A video match can be identified by predefined parameters or user defined parameters. For example, the predefined parameters comprise, but are not limited to: how related the video content is based on the title and the description of the video in relation to the application and user scenario and the producer of the video (e.g., from the application developer or from a third party).

Figure 2:
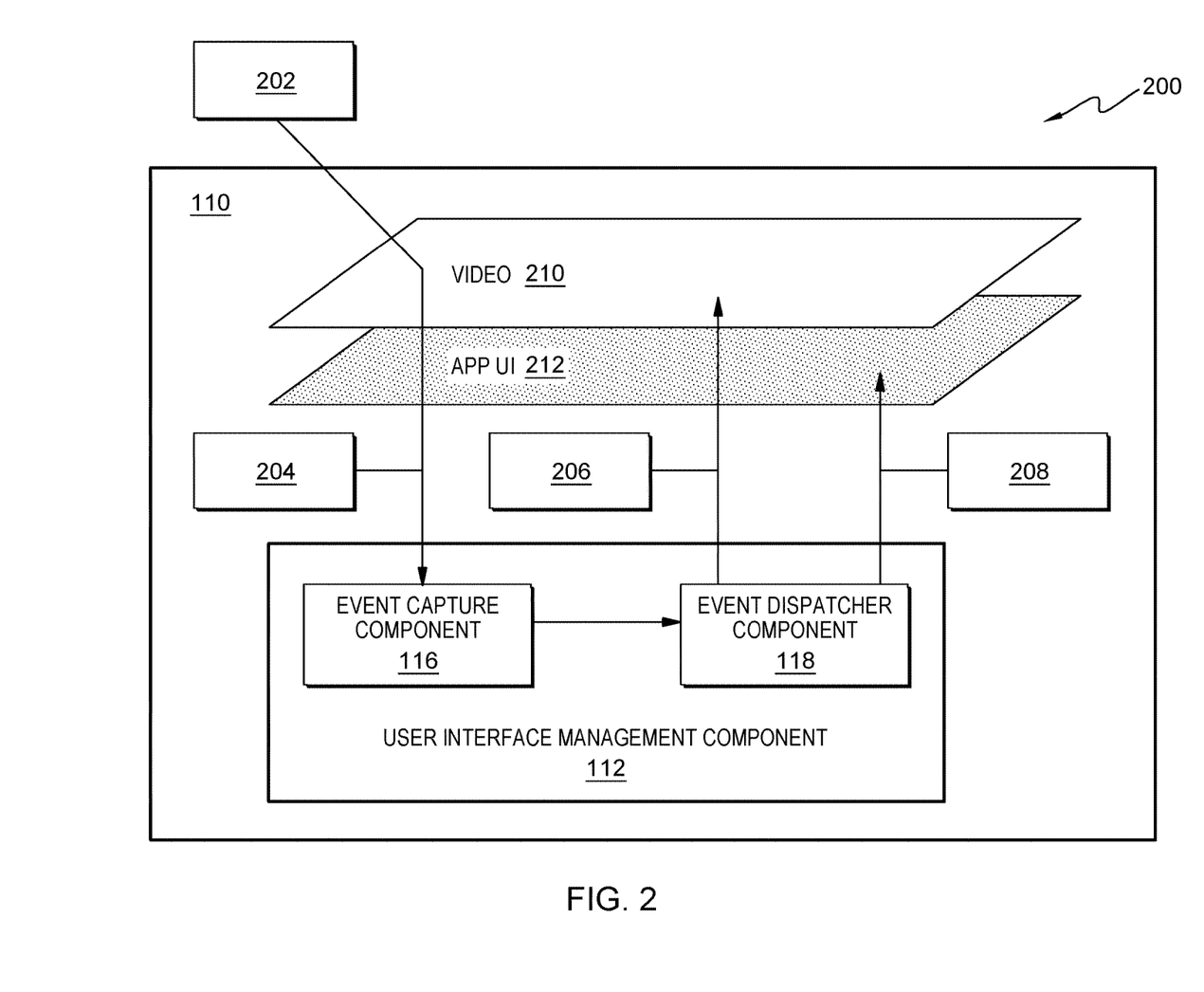
FIG. 2 is a flowchart depicting operational steps of a user interface management component, on a computing device within the distributed data processing environment of FIG. 1, for concurrently managing a translucent mask video display and an application user interface, in accordance with an embodiment of the present invention.

In various embodiments of the present invention, interface manager 112 can prioritize the identified matching videos by ranking the identified matching videos according to the predefined or user defined parameters. For example, the predefined parameters for ranking the identified matching videos comprises ranking the videos by most views, most recent (i.e., recently produced), the producer of the video (e.g., from the application developer or from a third party), and/or the highest rated. In various embodiments of the present invention, each parameter is given a predetermined weight. In various embodiments of the present invention, learning mode 114 can search the internet for videos and dynamically adjust the videos and the video searches to adapt to real time user activity. In various embodiments of the present invention, interface manager 112 can synchronize the translucent video player to the progress made operating the application (i.e., operations drive the playback of the video scenario instead of the video driving the operations). In various embodiments of the present invention, the video is combined with the application UI and played as a translucent mask over the application UI, as shown in FIG. 2. In various embodiments of the present invention, event capture 116 can capture a user's activity (e.g., performed user operations/activity such as key strokes, mouse clicks. stylus movement, and cursor movement) in the video mask and passes the captured user activity to dispatcher 118, in which dispatcher 118 relays the capture user activity to the processing unit running the application. Stylus movement is performed by a stylus-type input device including, but not limited to the finger of the user and a hand-held input device. The term "user activity" is used herein to refer actions taken by the user with respect to interactions with the underlying application. For example, a user activates a text entry field in the application, or a user moves a cursor from one input area of the application to another input area. Some embodiments of the present invention monitor user activity to determine when application engagement is occurring and what type of engagement is taking place.

In various embodiments of the present invention, while in hands-on mode, the video is shown as a translucent mask on top of the application UI, as shown in FIG. 2. In various embodiments of the present invention, as long as any user activity occurs within the translucent mask interface, the video will pause, and if no user activity is detected for a predetermined period of time, then the video will resume playing or begin playing if the video has yet to start playing. In various embodiments of the present invention, interface manager 112 can capture and dispatch operations performed by the user to the underline application. Meaning, people can watch the video and operate in the application concurrently. In various embodiments of the present invention, the video can be interlocked with application. In various embodiments of the present invention, a user's actions in video content area are captured and dispatched to video player and application, via interface manager 112.

In various embodiments of the present invention, the video playing functions (e.g., start, pause, resume, and stop) and application operation can be synchronized to a user's activity. For example, event capture 116 can capture an operation (i.e., user activity) such as a keystroke, a mouse click, cursor movement, and an operation performed on an application. In this particular example, dispatcher 118 dispatches the incoming captured user activity to the video player and application, and pauses the video for as long as the user activity is captured and/or a predetermined amount of time from the last captured user activity. In this example, dispatcher 118 relays the user activity to the underground application (e.g., the application) to complete user activity. In this example, dispatcher 118 resumes playing the video automatically when no user activity is captured for a predefined amount of time.

In this particular example, interface manager 112, via dispatcher 118, uses image recognition technology to determine whether user's activity is finished, wherein if dispatcher 118 determines the user's activity is finished then dispatcher 118 prompts the user to save any work and/or prompts the user to close the video and exit the program. In some embodiments of the present invention, dispatcher 118 can exit the video automatically when user activity is determined to be complete. In various embodiments of the present invention, interface manager 112 can monitor a user's facial expressions and eye focus to determine if the user is focused on the video and/or the application the user is working on. Image recognition technology can determine when a user's task is finished by comparing a current application interface and the interface displayed in the translucent video (e.g., current or future video frames) to identify if the user has completed the necessary tasks outlined in the video.

For example, from the video guide, if an action is expected by the user, the current application UI is compared with the UI depicted in the video (current or future videos frames). If the application UI is the same as the UI shown in the current video frame, then interface manager 112 determines that the user has performed the expected action since the expected application UI is displayed. To be more specific, in this particular example, a video guide instructs a user that clicking a button on interface 1 will change the application UI to interface 2. If user follows the video guide and clicks the button and the application UI changes from interface 1 to interface 2 then the user's action is what was expected, and interface manager 112 determines that the user has finished this action because the video frame currently shows interface 2. However, if the user's action is not finished and the application UI is still interface 1, then interface manager 112 determines the user hasn't finished the action and suggests reviewing the previously displayed instructions.

Some embodiments of the present invention would automatically replay the video from the beginning of the video segment presenting the change from user interface 1 to user interface 2. That is, video guides and other videos presented to the user may be segmented according to certain topics, modules, or lessons. Some embodiments of the present invention operate in such a way that when the actions of the user mirror the actions of a displayed lesson, the video continues to play. If the actions of the user do not match the displayed lesson, the interface manager may locate within the video frames the video frame(s) that correlate to the actions of the user or the currently shown interface of the application. When the video frame is identified, the video begins playing at that frame. Alternatively, the video begins playing at the beginning of the lesson that includes the matched frame. Alternatively, the user is prompted to select the lesson that is identified as being related to the user activity. Alternatively, the user is provided with a selection of video segments or lessons that may be played by the user to guide the user's actions.

In various embodiments of the present invention, event capture 116, continuously monitors and captures user activity such as cursor movements on UI 106, keystrokes, and mouse clicks, and sends the captured user activity to dispatcher 118 to dispatch the user activity to the underground application (i.e., the application being masked by the translucent video player). In various embodiments of the present invention, once user activity is received by dispatcher 118, dispatcher 118 can dispatch the user activity and trigger commands to the video and application separately. For example, dispatcher 118 sends instructions the video player to pause playing immediately. In this example, if no user activity is captured for a predefined period of time (e.g., 5 seconds) then dispatcher 118 instructs the video player to continue to play, automatically. Continuing this example, dispatcher 118 instructs the application to pass the incoming user input content (i.e., captured user activity) to the underlying application. In other embodiments, the separately dispatched user activity and trigger commands issued by dispatcher 118 to the video player and to the underlying application can be issued concurrently.

In various embodiments of the present invention, the video player can be manually controlled by a user. For example, a user can play and pause the video manually. The users can pause or start the video at any time since the input cursor usually is not in the video content area or window. In various embodiments of the present invention, image recognition technology can be used by interface manager 112 to compare the video mask and the current application UI as an enhanced feature to control the progress of the video. For example, if the application UI is in sync with a video's real-time frame imaging, then the video continues to play. In this example, if the application UI lags behind the video's real-time frame image and some action is expected by the user, then the video can stop and wait for the user's action; if the user action is correct and the application's UI changes to the same UI displayed in the video's current frame image, then the video continues to play. In this example, if the application's UI is different from what is displayed in the video's frame, and the application UI is also not shown in the next video frames (e.g., remaining or previous portions of the video) then interface manager 112 determines that the user is off the course and can change the video to another scenario, wherein interface manager 112 searches and identifies a video guide for the user based on the new identified scenario(s).

In various embodiments of the present invention, the video selection is not limited to the local static files. A user can have more flexibility to perform scenario-based work in an application because user actions can drive the presentation of the selected video. More specifically, the video scenario is dynamically changed according to operations performed by the user in the application that is concurrently running with the translucent video mask. For example, a user starts an application and enters the hands-on mode, once context analysis is done against the current content of application, and the learning videos are searched from internet according to the analysis result. The most viewed or most recommended (most reviewed/highest rated) video will be shown and played automatically. In this example, if the user does perform any action, then interface manager 112 determines that the automatically selected video is what the user wanted and will continue playing the video.

In this example, if the user performs some action and/or the content of current application UI is changed then a one deviation analysis is performed against the current context of application, the remaining portion of the current video, and the other available online videos. In this particular example, if there is no similar content in both the remaining portion of the current video or the online videos, then a display prompt with be generated and displayed to the user displaying a predetermined message (e.g., "no better suitable video available") and interface manager 112 will continue playing the current video.

In this example, if there is similar content in the remaining portion of the current video then interface manager 112, via learning mode 114, will adjust the current video to jump either forward or backward to the matched frame that comprises the identified similar content and continues playing the video from the jump point. In this example, if there is no similar content in the remaining portion of the current video, but learning mode 114 determines there is a related video online that contains similar content required by the user, then learning mode 114 replaces the current video with the new identified video. In various embodiments of the present invention, properties of correlated points can be used to automatically detect the correlated points between an application graphic user interface (GUI) and video: Video (frame ID) and Application (GUI ID, Component ID, Widget ID).

FIG. 2 illustrates operational steps of interface manager 112, generally designated 200, executing with computing device 110, within distributed data processing environment 100 of FIG. 1, for concurrently managing a video interface and application interface, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In FIG. 2, video 210 is a visual depiction of a translucent mask video display over application UI 212. In this particular embodiment, video 210 represents a video playing on a translucent mask video display and application UI (app UI) 212 represents a user interface for an application on computing device 110. In step 202, a user's action is detected by event capture 116. For example, a user clicks on video 210 or the user begins typing in application UI 212, while a video is playing on video 210. In step 204, the detected user's action is captured by event capture 116 and event capture 116 passes the captured user action to dispatcher 118 by sending the captured user's action to dispatcher 118. In step 206, dispatcher 118 sends a control signal to video 210 instructing the video 210 to pause the playing video. In step 2018, dispatcher 118 processes the user's actions in application UI 212 and changes application UI 212 accordingly, based on the user's captured actions. For example, if the user types some information in application UI 212 or opens and edits some settings in application UI 212 then dispatcher 118 will update application UI 212 to reflect the captured user activity. In various embodiments, step 206 and step 208 can be executed individually but also simultaneously or sequentially.

Figure 3:
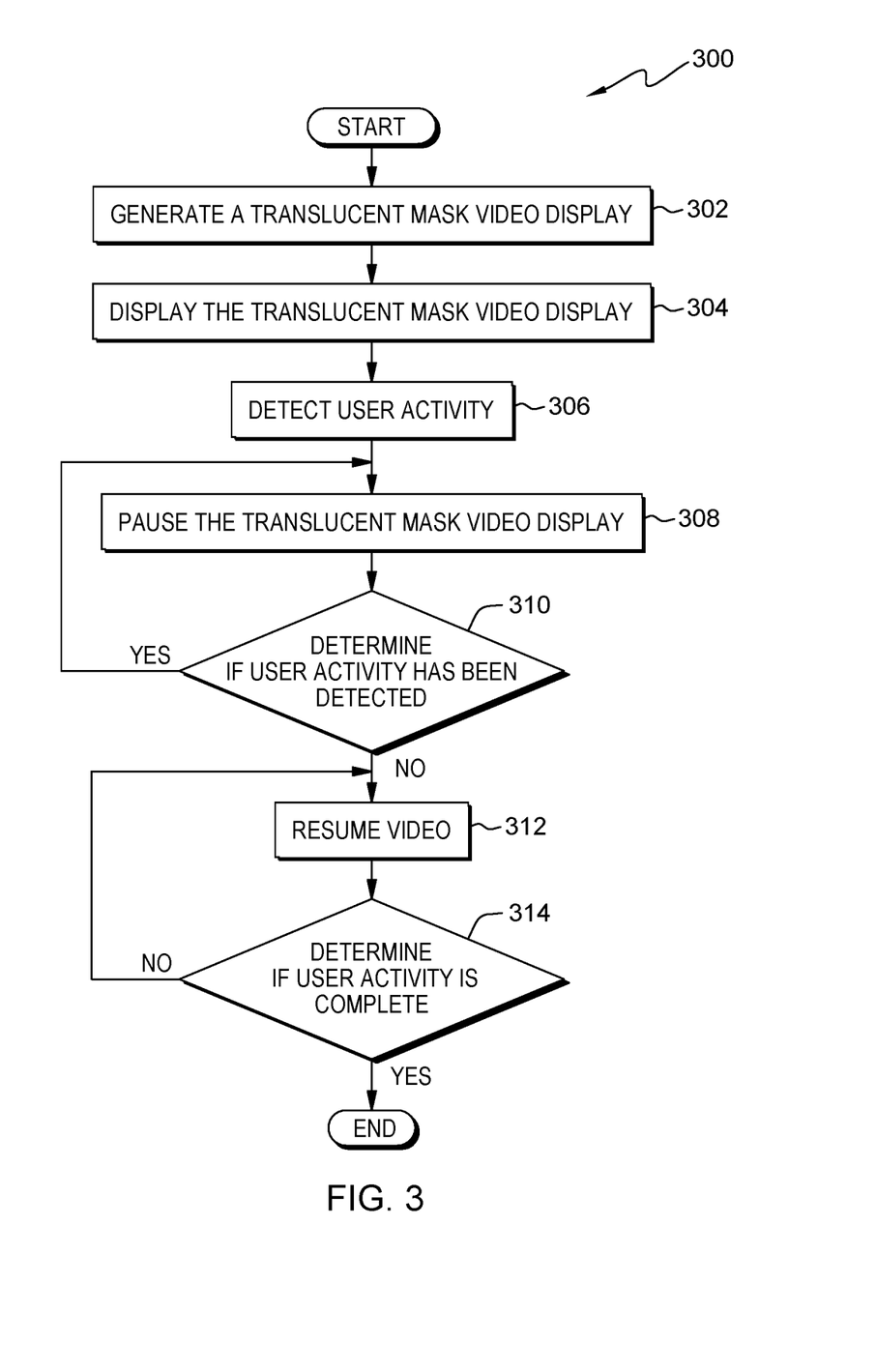
FIG. 3 illustrates operational steps of the user interface management component, on the computing device within the distributed data processing environment of FIG. 1, for concurrently managing a translucent mask video display and an application user interface, in accordance with an embodiment of the present invention.

FIG. 3 illustrates operational steps of interface manager 112, generally designated 300, in communication with computing device 110, within distributed data processing environment 100 of FIG. 1, for concurrently managing a video interface and application interface, in accordance with an embodiment of the present invention. FIG. 3 provides an illustration of one implementation and does not imply any limitations with regard to the environments in which different embodiments can be implemented. Many modifications to the depicted environment can be made by those skilled in the art without departing from the scope of the invention as recited by the claims.

In step 302, interface manager 112 generates a translucent mask video display. In various embodiments of the present invention, interface manager 112, via learning mode 114, can generate a translucent mask video display of a selected video that masks an application on mobile device 110, wherein the translucent mask video display enables a user to view the video while simultaneously performing user activity in the application.

In step 304, interface manager 112 displays the translucent mask video display over an application. In various embodiments of the present invention, interface manager 112, via learning mode 114, can display a translucent mask video display over one or more application on computing device 110.

In step 306, interface manager 112 detects user activity on UI 106. In various embodiments of the present invention, interface manager 112, via event capture 116, can capture a user activity on UI 106. For example, if a user moves the cursor or begins typing then event capture 116 captures the cursor movement or the keystrokes typed by the user. In various embodiments of the present invention, event capture 116 sends the captured user activity to dispatcher 118.

In step 308, interface manager 112 pauses the translucent mask video display. In various embodiments of the present invention, interface manager 112, via dispatcher 118 receives the captured user activity from event capture 116 and sends instructions to the translucent mask video display to pause the video. In various embodiments of the present invention, dispatcher 118 relays the captured user activity (e.g., cursor movement or keystrokes/user operations) to the application under the translucent mask video display. In various embodiments of the present invention, event capture 116 can pause the video for a predetermined amount of time or for as long as user activity is captured.

In step 310, interface manager 112 determines if user activity has been detected. In various embodiments of the present invention, interface manager, via event capture 116, can continuously monitor for user activity. In various embodiments of the present invention, event capture 116 can pause the video for a predetermined amount of time or for as long as user activity is captured. In the depicted embodiment, if activity is detected and/or captured by event capture 116 (Yes step) then interface manager 112, via dispatcher 118, can pause the video playing on the translucent mask video display and keep the video paused until no user activity is detected for a predetermined amount of time and output the captured user activity to the application masked by the translucent video display. In various embodiments of the present invention, if no user activity is detected by event capture 116 (No step) then dispatcher 118 can send instructions to the translucent mask video display to resume playing the video.

In step 312, interface manager 112 resumes the video. In various embodiments of the present invention, dispatcher 118 can send instructions to the translucent mask video display to resume playing the video when no user activity is detected for a predetermined amount of time.

In step 314, interface manager 112 determines if user activity is complete. In various embodiments of the present invention, interface manager 112, via dispatcher 118, uses image recognition technology to determine whether user's activity is finished. In various embodiments of the present invention, if dispatcher 118 determines the user's activity is finished then dispatcher 118 can generate and display responsive prompts to the user. In various embodiments of the present invention, the generate prompts prompt to the user to save any work and/or prompts the user to close the video and exit the program. In some embodiments of the present invention, dispatcher 118 can exit the video automatically when user activity is determined to be complete or when the video ends.

Figure 4:
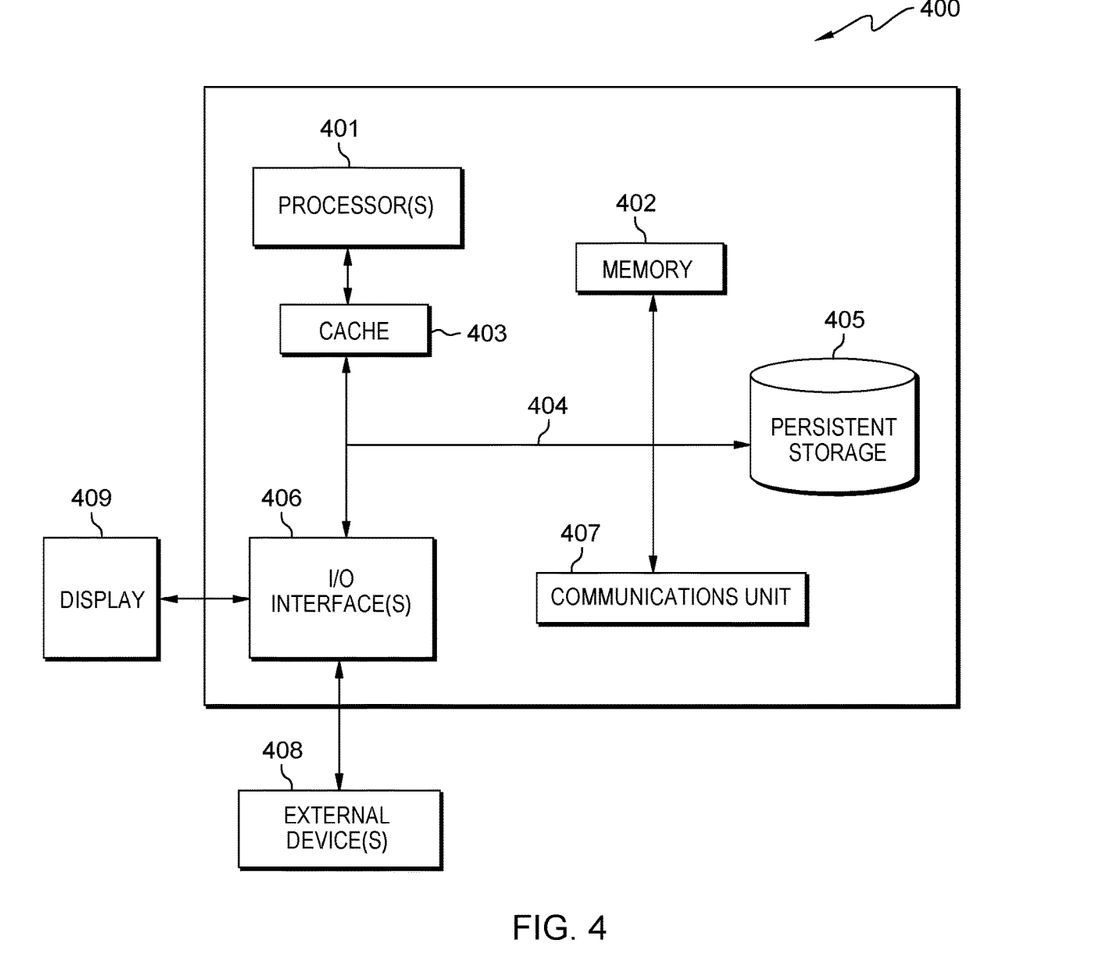
FIG. 4 depicts a block diagram of components of the computing device executing the intelligent mapping program within the distributed data processing environment of FIG. 1, in accordance with an embodiment of the present invention.

FIG. 4 depicts a block diagram of components of computing device 110 and/or server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts computer system 400, where computing device 110 represents an example of computer system 400 that includes interface manager 112. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention can be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 can also be removable. For example, a removable hard drive can be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 can provide communications through the use of either or both physical and wireless communications links. Program instructions and data used to practice embodiments of the present invention can be downloaded to persistent storage 405 through communications unit 407.

I/O interface(s) 406 enables for input and output of data with other devices that can be connected to each computer system. For example, I/O interface 406 can provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for concurrently managing a video display and an application user interface, the method comprising:
    generating a translucent mask video display over a computer-implemented application;
    displaying a video in the translucent mask video display over the computer-implemented application;
    detecting user activity associated with the computer-implemented application;
    dynamically adjusting a video search in real-time based on the detected and captured user activity, wherein dynamically adjusting the video search comprises:
        performing a one deviation analysis against one or more current context of the computer-implemented application and one or more remaining portions of the video and one or more available online videos; and
        responsive to determining that no desired similar content is found in both the one or more online videos and the remaining portion of the video, displaying a prompt to a user and resuming the video;
    pausing the video in the translucent mask video display when the user activity is detected;
    responsive to an end to the user activity, translating the detected user activity as a set of computer operations;
    outputting the set of computer operations for performance on the computer-implemented application; and
    responsive to detecting no user activity for a predetermined period of time, resuming the video in the translucent mask video display.

2. The computer-implemented method of claim 1 further comprising:
    searching the internet and a database for videos based on a user's need or problem the user is trying to solve;
    selecting videos based on the user's need and problem the user is trying to solve; and
    ranking the selected videos based on predetermined parameters.

3. The computer-implemented method of claim 2 further comprising:
    syncing the video displayed in the translucent mask video display with the user activity;
    dynamically adjusting the video search in real-time based on the detected user activity, wherein dynamically adjusting the video search comprises:
        performing a one deviation analysis against a current context of the computer-implemented application and a remaining portions of the video and other available online videos; and
        responsive to determining that no similar content is identified in the remaining portions of the video but determines there is a related video online that contains desired similar content, replacing the video in the translucent mask video display with a new identified video.

4. The computer-implemented method of claim 1 further comprising:
    determining a user is finished with a task, wherein determining the user is finished with the task comprises:
        comparing a current application interface and a translucent video interface to identify if the user has completed a necessary task outlined in the video, wherein the translucent video interface comprises current or future video frames; and
    prompting the user to save any work and/or prompts the user to close the video and exit a program.

5. The computer-implemented method of claim 1 further comprising:
dynamically adjusting the video in the translucent mask video display, wherein adjusting the video comprises:
adjusting a current video to jump either forward or backward to a frame that comprises identified matching or similar content to the user's activity in the computer-implemented application and continues playing the video from a jump point.

6. The computer-implemented method of claim 1, wherein the user activity is movement of a stylus device from one portion of an interface of the computer-implemented application to another portion of the interface.

7. A computer program product for concurrently managing a video display and an application user interface, the computer program product comprising:
one or more computer readable storage devices and program instructions stored on the one or more computer readable storage devices, the stored program instructions comprising:
program instructions to generate a translucent mask video display over a computer-implemented application;
program instructions to display a video in the translucent mask video display over the computer-implemented application;
program instructions to detect user activity associated with the computer-implemented application;
program instructions to dynamically adjust a video search in real-time based on the detected and captured user activity, wherein dynamically adjusting the video search comprises:
program instructions to perform a one deviation analysis against one or more current context of the computer-implemented application and one or more remaining portions of the video and one or more available online videos; and
responsive to determining that no desired similar content is found in both the one or more online videos and the remaining portion of the video, program instructions to display a prompt to a user and resume the video;
program instructions to pause the video in the translucent mask video display when the user activity is detected;
responsive to an end to the user activity, program instructions to translate the detected user activity as a set of computer operations;
program instructions to output the set of computer operations for performance on the computer-implemented application; and
responsive to detecting no user activity for a predetermined period of time, program instructions to resume the video in the translucent mask video display.

8. The computer program product of claim 7 further comprising:
program instructions to search the internet and a database for videos based on a user's need or problem the user is trying to solve;
program instructions to select videos based on the user's need and problem the user is trying to solve; and
program instructions to rank the selected videos based on predetermined parameters.

9. The computer program product of claim 8 further comprising:

program instructions to sync the video displayed in the translucent mask video display with the user activity;
program instructions to dynamically adjust the video search in real-time based on the detected and captured user activity, wherein dynamically adjusting the video search comprises:
program instructions to perform a one deviation analysis against a current context of the computer-implemented application and a remaining portions of the video and the other available online videos; and
responsive to determining that no similar content is identified in the remaining portions of the video but determines there is a related video online that contains the desired similar content, program instructions to replace the video in the translucent mask video display with a new identified video.

10. The computer program product of claim 7 further comprising:
program instructions to determine a user is finished with a task, wherein determining the user is finished with the task comprises:
program instructions to compare a current application interface and a translucent video interface to identify if the user has completed a necessary tasks outlined in the video, wherein the translucent video interface comprises current or future video frames; and
program instructions to prompt the user to save any work and/or prompts the user to close the video and exit a program.

11. The computer program product of claim 7 further comprising:
program instructions to dynamically adjust the video in the translucent mask video display, wherein adjusting the video comprises:
program instructions to adjust a current video to jump either forward or backward to a frame that comprises identified matching or similar content to the user's activity in the computer-implemented application and continues playing the video from a jump point.

12. The computer program product of claim 7, wherein the user activity is movement of a stylus device from one portion of an interface of the computer-implemented application to another portion of the interface.

13. A computer system for concurrently managing a video display and an application user interface, the computer system comprising:
one or more computer processors;
one or more computer readable storage devices;
program instructions stored on the one or more computer readable storage devices for execution by at least one of the one or more computer processors, the stored program instructions comprising:
program instructions to generate a translucent mask video display over a computer-implemented application;
program instructions to display a video in the translucent mask video display over the computer-implemented application;
program instructions to detect user activity associated with the computer-implemented application;
program instructions to dynamically adjust a video search in real-time based on the detected and captured user activity, wherein dynamically adjusting the video search comprises:
program instructions to perform a one deviation analysis against one or more current context of the computer-implemented application and one or more remaining portions of the video and one or more available online videos; and responsive to determining that no desired similar content is found in both the one or more online videos and the remaining portion of the video, program instructions to display a prompt to a user and resume the video;

program instructions to pause the video in the translucent mask video display when the user activity is detected;

responsive to an end to the user activity, program instructions to translate the detected user activity as a set of computer operations;

program instructions to output the set of computer operations for performance on the computer-implemented application; and responsive to detecting no user activity for a predetermined period of time, program instructions to resume the video in the translucent mask video display.

14. The computer system of claim 13 further comprising:
program instructions to search the internet and a database for videos based on a user's need or problem the user is trying to solve;
program instructions to select videos based on the user's need and problem the user is trying to solve;
program instructions to rank the selected videos based on predetermined parameters; and
program instructions to sync the video displayed in the translucent mask video display with the user activity.

15. The computer system of claim 14 further comprising:
program instructions to dynamically adjust the video search in real-time based on the detected and captured user activity, wherein dynamically adjusting the video search comprises:

program instructions to perform a one deviation analysis against a current context of the computer-implemented application and a remaining portions of the video and the other available online videos; and responsive to determining that no similar content is identified in the remaining portions of the video but determines there is a related video online that contains the desired similar content, program instructions to replace the video in the translucent mask video display with a new identified video.

16. The computer system of claim 13 further comprising:
program instructions to determine a user is finished with a task, wherein determining the user is finished with the task comprises:
program instructions to compare a current application interface and a translucent video interface to identify if the user has completed a necessary tasks outlined in the video, wherein the translucent video interface comprises current or future video frames; and
program instructions to prompt the user to save any work and/or prompts the user to close the video and exit a program.

17. The computer system of claim 13 further comprising:
program instructions to dynamically adjust the video in the translucent mask video display, wherein adjusting the video comprises:
program instructions to adjust a current video to jump either forward or backward to a frame that comprises identified matching or similar content to the user's activity in the computer-implemented application and continues playing the video from a jump point.

* * * * *